Sept. 7, 1954     W. McLAUGHLIN ET AL     2,688,385
ROTARY HYDRAULIC BRAKE MACHINE
Filed Dec. 29, 1952     2 Sheets-Sheet 2
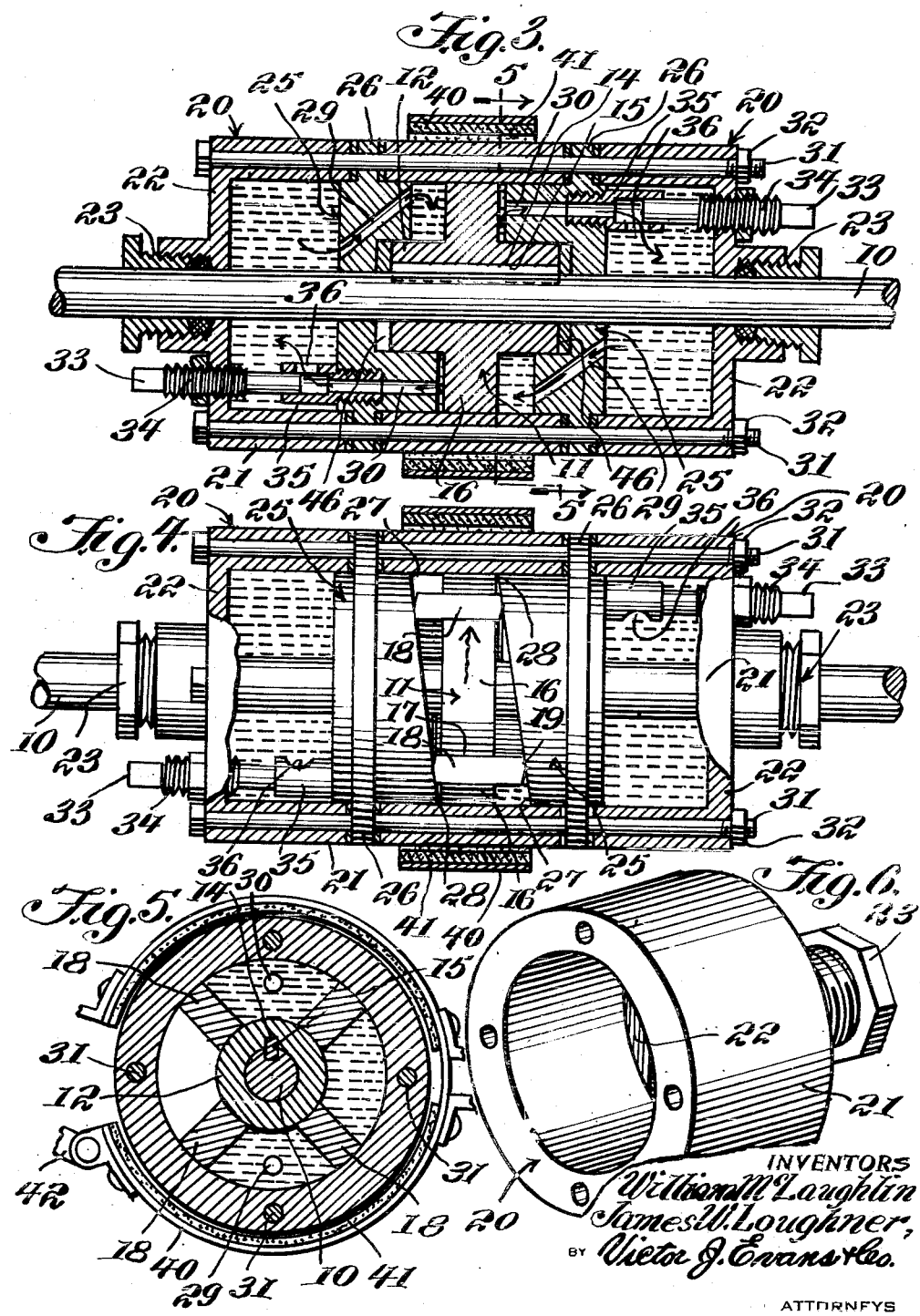

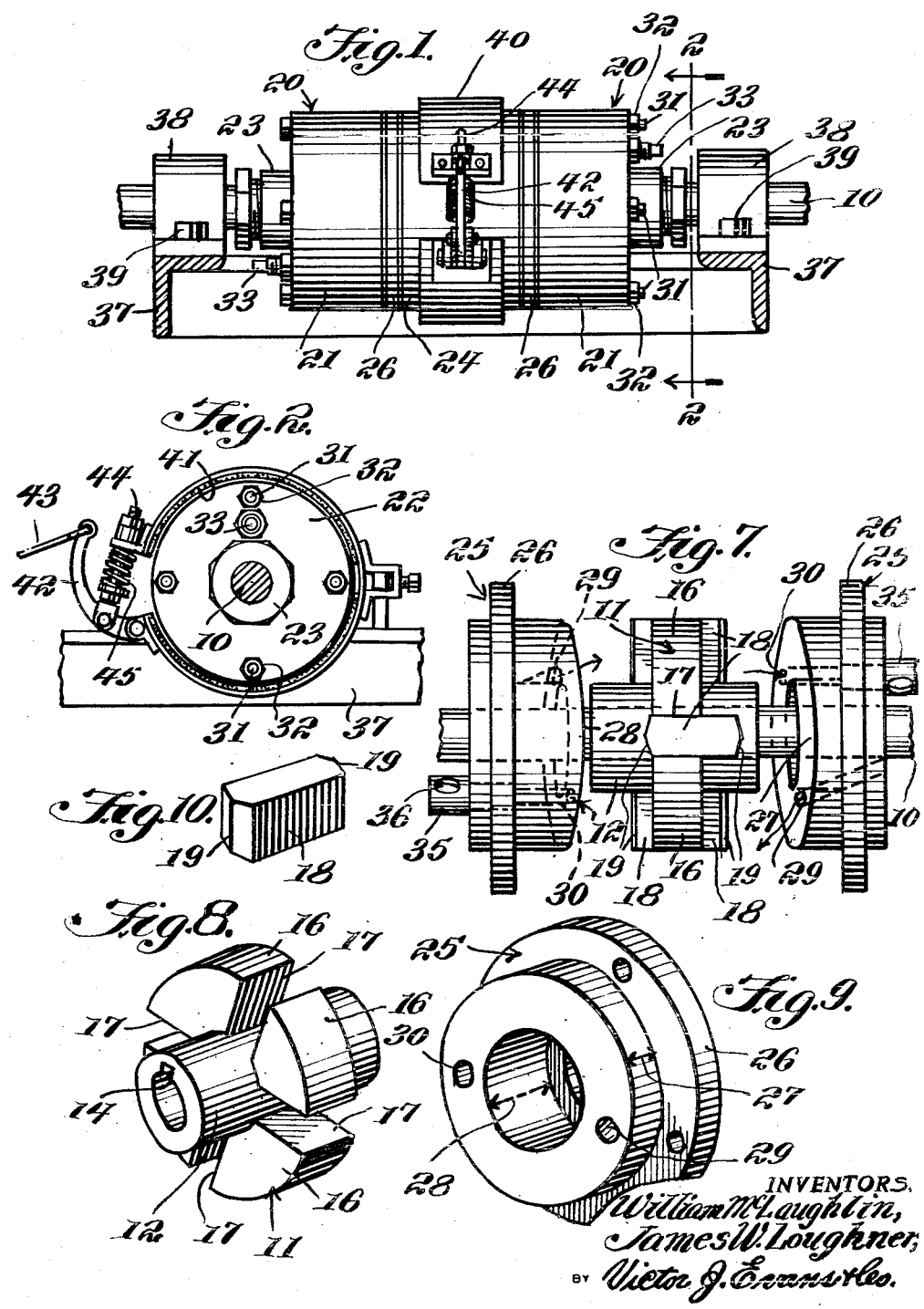

Patented Sept. 7, 1954

2,688,385

UNITED STATES PATENT OFFICE 2,688,385

ROTARY HYDRAULIC BRAKE MACHINE

William McLaughlin and James W. Loughner, Smithfield, Pa.

Application December 29, 1952, Serial No. 328,280

5 Claims. (Cl. 188—90)

This invention relates to a brake mechanism, and more particularly to a hydraulic brake mechanism for controlling rotation of a shaft.

The object of the invention is to provide a brake mechanism whereby a braking action can apply to a rotating shaft to control the speed of the shaft or completely stop the rotation of the shaft.

Another object of the invention is to provide a rotary hydraulic brake which may be used in a vehicle, motor, or any other locality whereby a braking action is to be applied to a rotating shaft, there being a means for adjusting the operation of the brake.

A further object of the invention is to provide a rotary hydraulic brake which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing the rotary hydraulic brake of the present invention.

Figure 2 is a sectional view taken on the line 2—2 of Figure 1.

Figure 3 is a longitudinal sectional view taken through the hydraulic brake of the present invention.

Figure 4 is a side elevational view of the brake, with parts broken away and in section.

Figure 5 is a sectional view taken on the line 5—5 of Figure 3.

Figure 6 is a perspective view showing one of the end pieces.

Figure 7 is an elevational view showing the parts in exploded or disassembled position.

Figure 8 is a perspective view of the rotor.

Figure 9 is a perspective view of one of the discs.

Figure 10 is a perspective view of one of the sliding vanes.

Referring in detail to the drawings, the numeral 10 designates a shaft which may be rotated or driven by any suitable power source such as a motor or a vehicle engine, and the present invention is directed to a brake mechanism for controlling the rotation of the shaft 10. The brake mechanism of the present invention includes a rotor 11, Figure 8, and the rotor 11 includes a cylindrical hub 12 that is circumposed on the shaft 10. The hub 12 is provided with an interior slot 14 for receiving a key 15, Figure 5, whereby the rotor 11 can be keyed to the shaft 10. Thus, as the shaft 10 rotates the rotor 11 will rotate therewith.

Extending outwardly from the cylindrical hub 12 and secured thereto or formed integral therewith is a plurality of wings 16 and the wings 16 are spaced apart to define therebetween a passageway 17. Reciprocably or slidably mounted in each of the passageways 17 between the wings 16 is a vane or block 18, and the ends 19 of the blocks 18 are inclined or beveled for a purpose to be later described.

A housing surrounds the shaft 10 and rotor 11, and the housing includes a pair of end pieces 20, Figure 6. Each of the end pieces 20 includes an annular side wall 21 and an end wall 22. A packing gland 23 extends from each of the end walls 22, and the shaft 10 extends through the packing 23. Interposed between the pair of end pieces 20 is a casing or collar 24 which is annular in shape. Arranged on opposite sides of the rotor 11 is a pair of discs 25, Figure 9. Each of the discs 25 includes an annular flange 26 which is snugly positioned between the meeting edges of the casing 24 and the end pieces 22. The inner surface of each of the discs 25 is provided with a cam and the cam includes a low point 27 and a high point 28. Further, each of the discs 25 is provided with an outlet port 30 and an inlet port 29, the inlet port 29 being arranged angularly or inclined as shown in Figure 3. The cam including the high 28 and the low 27 is adapted to be engaged by the ends 19 of the moving vanes 18.

A means is provided for maintaining the parts of the housing connected together, and this means comprises elongated bolts 31 which extend through the end pieces 22 and through the flanges 26 and through the casing 24, and suitable nuts 32 are arranged in threaded engagement with the projecting ends of the bolts 31. Furthermore, a means is provided for controlling the flow of hydraulic fluid through the outlet openings 30 in the discs 25, and this last named means comprises a plug 33 which has a threaded portion 34 arranged in threaded engagement with each of the end walls 22. A valve member or shell 35 is arranged in threaded engagement with each of the discs 25, and the valve member 35 includes a discharge opening 36. The inner end of the plug 33 is mounted for movement into and out of bridging relation or closing relation with respect to the discharge opening 36. Thus, by rotating the plug 33 in the end wall 22, the size of the discharge opening 36 and consequently the rate of flow of hydraulic fluid through the port 30 can be controlled so that a means is provided for regulating the action of the brake mechanism.

The numeral 37 designates a suitable support for bearings 38 which are connected thereto by bolt and nut assemblies 39, and the shaft 10 may extend through the bearings 38. A brake band 40 surrounds the casing 24, and the brake band 40 has mounted on its inner surface a lining 41 which is mounted for movement into and out of frictional engagement with the outer surface of the casing 24. A lever 42 is connected to one end of the brake band 40, and a suitable rod or cable 43 may be connected to the lever 42 for actuating the brake band 40. A rod 44 has a coil spring 45 circumposed thereon, and the coil spring 45 serves to normally maintain the brake 40 in its off position. A washer 46 is positioned adjacent each of the ends of the hub 12.

In use, the housing is filled with a small quantity of hydraulic fluid and the shaft 10 may be driven by any suitable motor or engine. Then, to control the speed of rotation of the shaft 10 or to stop the rotation of the shaft 10, pressure is applied to the rod 43 by any suitable means and this causes the brake band 40 to move the band 41 into frictional engagement with the casing portion 24 of the housing. Depending on how much pressure is applied to the brake band, the rotation of the casing 24, end pieces 20, and discs 25 will be stopped completely or slowed down so that only the shaft 10 and rotor 11 will continue to rotate. As the rotor 11 turns, the vanes 18 will be constantly moved back and forth between the wings 16 due to the fact that the high points 28 and the low points 27 of the cam surfaces engage the ends 19 of the movable vanes 18. Thus, it will be seen that by holding the discs 25 stationary or by holding the discs 25 under slight frictional pressure so that the discs 25 do not rotate as fast as the rotor 11, the hydraulic fluid will be constantly compressed between the wings 16 and this hydraulic fluid under pressure will be forced out through the ports 30 in the discs 25. Thus, passage of the hydraulic fluid through the restricted ports 30 provides that there will be a braking action exerted on the rotating shaft 10. At the same time, hydraulic fluid is passing through the ports 29 into the interior of the discs so that the cycle is continuous.

The brake mechanism of the present invention can be used on any machine in which a drive shaft is utilized. It will be seen that the parts are so arranged that hydraulic fluid or oil is flowing out through one of the ports 30 while the hydraulic fluid is flowing in through the other port 29. The plugs 33 can be adjusted to control the rate of flow of hydraulic fluid through the discharge opening 36. When the brakes are applied, as by means of the lever 43, the sliding vanes 18 will engage the cam surfaces to pump out the oil through the openings 30. Since the flow of hydraulic fluid through the port 30 and discharge opening 36 is through a restricted opening, a braking action will be exerted on the rotating shaft. It will be noted that the braking mechanism of the present invention is double acting in that there are provided two of the discs 25.

We claim:

1. A hydraulic brake for a shaft comprising a rotor keyed to the shaft and including a cylindrical hub, a plurality of wings extending from said hub and spaced apart to provide radial passageways, a vane slidably positioned in each of said passageways, a housing positioned on said shaft and including a pair of end pieces each including an annular side wall and an end wall, a cylindrical casing interposed between said pair of end pieces and having the same outside diameter as said side walls, and a pair of discs arranged on opposite sides of said rotor, each of said discs including an annular flange interposed between said casing and the corresponding end piece, there being an outlet port and an inclined inlet port in each of said discs, the inner surface of each of said discs being shaped to provide a cam surface having high and low points, there being a central recess in the inner surface of each of said discs for receiving the ends of said hub, a packing gland extending outwardly from each wall of said end piece, bolt and nut means for maintaining the parts of said housing connected together, a brake band surrounding said casing, a lining connected to the inner surface of said brake band.

2. The apparatus as described in claim 1, and further including a lever for moving said brake band and lining into engagement with said casing.

3. The apparatus as described in claim 1, and further including a coil spring for maintaining said brake band in its off position.

4. A hydraulic brake for a shaft comprising a rotor keyed to the shaft and including a cylindrical hub, a plurality of wings extending from said hub and spaced apart to provide radial passageways, a vane slidably positioned in each of said passageways, a housing positioned on said shaft and including a pair of end pieces each including an annular side wall and an end wall, a cylindrical casing interposed between said pair of end pieces and having the same outside diameter as said side walls, and a pair of discs arranged on opposite sides of said rotor, each of said discs including an annular flange interposed between said casing and the corresponding end piece, there being an outlet port and an inclined inlet port in each of said discs, the inner surface of each of said discs being shaped to provide a cam surface having high and low points, there being a central recess in the inner surface of each of said discs for receiving the ends of said hub, a packing gland extending outwardly from each wall of said end piece, bolt and nut means for maintaining the parts of said housing connected together, a brake band surrounding said casing, a lining connected to the inner surface of said brake band, a valve member arranged in threaded engagement with each of said outlet ports and provided with a discharge opening, and a plug threadedly engaging said end pieces and mounted for movement into and out of bridging relation with respect to said discharge openings.

5. In a hydraulic brake for a shaft, a rotor keyed to the shaft and including a cylindrical hub, a plurality of wings extending from said hub and spaced apart to provide radial passageways, a vane slidably positioned in each of said passageways, a housing positioned on said shaft and including a pair of end pieces each including an annular side wall and an end wall, a cylindrical casing interposed between said pair of end pieces and having the same outside diameter as said side walls, and a pair of discs arranged on opposite sides of said rotor, each of said discs including an annular flange interposed between said casing and the corresponding end piece, there being an outlet port and an inclined inlet port in each of said discs, the inner surface of each of said discs being shaped to provide a cam surface having high and low points there being a central recess in the inner surface of each of said discs for receiving the ends of said hub, a packing gland extending outwardly from each wall of said end piece, bolt and nut means for maintaining the parts of said housing connected together, a valve member arranged in threaded engagement with each of said outlet ports and provided with a discharge opening, and a plug threadedly engaging said end pieces and mounted for movement into and out of bridging relation with respect to said discharge openings.

References Cited in the file of this patent

UNITED STATES PATENTS

| Number | Name | Date |
|---|---|---|
| 1,618,748 | Beard | Feb. 22, 1927 |
| 1,743,977 | Petersen | Jan. 14, 1930 |
| 1,781,437 | Chisholm | Nov. 11, 1930 |
| 2,118,808 | Corbin, Jr. | May 31, 1938 |
| 2,158,557 | Van Lammeren | May 16, 1939 |
| 2,185,498 | Carson et al. | Jan. 2, 1940 |
| 2,225,079 | Neal | Dec. 17, 1940 |
| 2,241,189 | Dick | May 6, 1941 |
| 2,334,629 | James, Jr. | Nov. 16, 1943 |
| 2,497,993 | James | Feb. 21, 1950 |
| 2,633,803 | Carey | Apr. 7, 1953 |